L. TOPF.
DRUM FOR THE WORKING OF ANY KIND OF GRAIN.
APPLICATION FILED APR. 8, 1912.

1,138,331.

Patented May 4, 1915.

Witnesses:
C. G. McGee.
W. H. Brereton.

Inventor:
Ludwig Topf
By
Attorney.

UNITED STATES PATENT OFFICE.

LUDWIG TOPF, OF ERFURT, GERMANY.

DRUM FOR THE WORKING OF ANY KIND OF GRAIN.

1,138,331.     Specification of Letters Patent.     Patented May 4, 1915.

Application filed April 8, 1912. Serial No. 689,336.

*To all whom it may concern:*

Be it known that I, LUDWIG TOPF, manufacturer, of Erfurt, in the Kingdom of Prussia, Empire of Germany, have invented certain new and useful Improvements in Drums for the Working of Any Kind of Grain, of which the following is a full, clear, and exact description.

This invention relates to an apparatus for working various kinds of grain, in preparing them for steeping, germinating, drying or aerating, and has for its principal object to provide a drum or other cylindrically formed device adapted to remove dust and other foreign particles from the grains, in such a manner that the grain is thoroughly and quickly cleaned and is simultaneously aerated to a certain degree.

A particular object is to provide an apparatus of simple construction which is adapted to clean grain by means of air currents, which are circulated through the mass of grain held in the drum, and it is also an object to so direct the air currents through the grain that all parts of the body of grain will be reached and equally cleaned.

Figure 1:
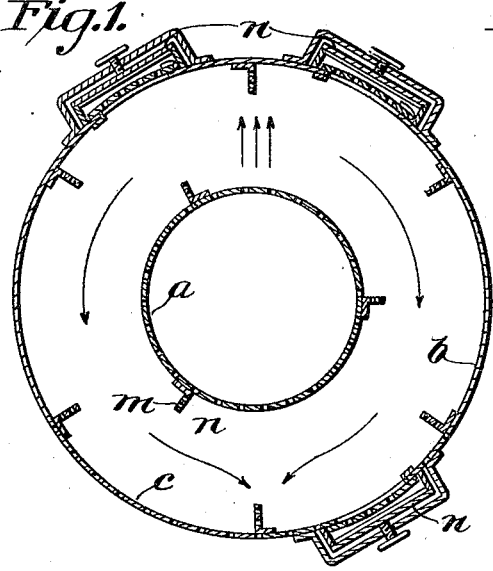
Figure 2:
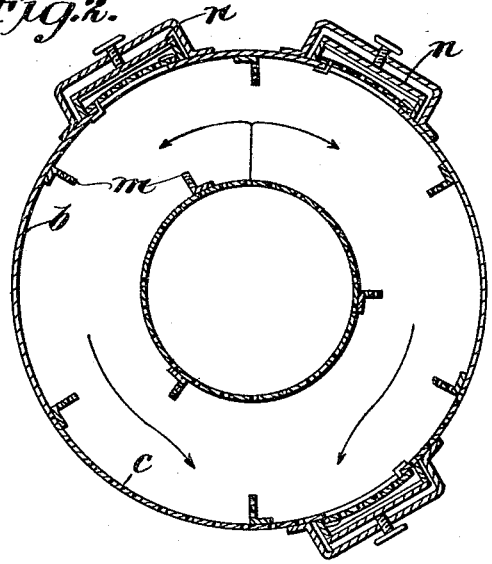
Figure 4:
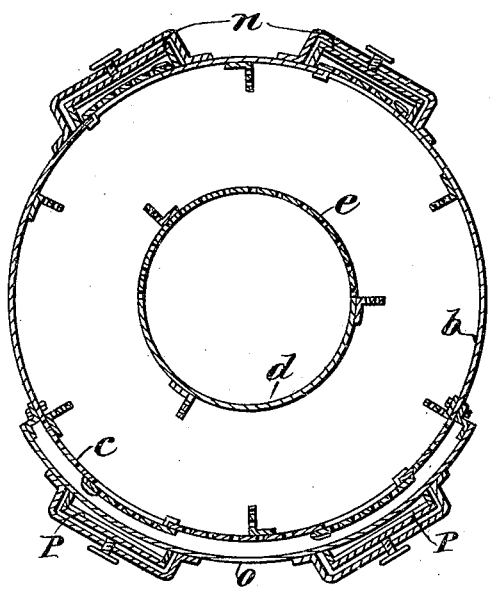
Figure 3:
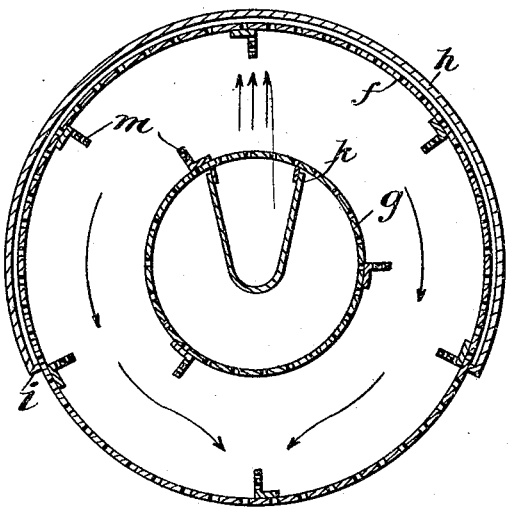

In the drawings, which form a part of this specification, are illustrated several forms of the device which forms the subject matter of this invention, and therein, Figure 1 is a cross sectional view of one of the forms of the device, Fig. 2 is a cross sectional view of a modification of Fig. 1, Fig. 3 is a second modification, and Fig. 4 is a fourth form of the device.

Referring more particularly to said drawings, $b$ indicates a drum or similar cylindrical vessel, which is provided with closed ends and a series of charging and discharge openings, each of the openings having a cover $n$ adapted to hermetically seal the openings or man-holes. Mounted longitudinally within said drum $b$ to be rotated therewith, and preferably concentrically thereof, is an air supply pipe $a$. Said air supply pipe $a$, in the form shown in Fig. 1, is suitably perforated throughout its circumference. A plurality of wings or baffle plates $m$ are secured to the outer circumference of the pipe $a$ and the interior surface of the drum $b$ to aid in the working of the grain in the drum and to aid in the circulation of the air.

The drum $b$ is formed of a solid sheet or body of metal throughout the major part of its periphery, but at one side, as at $c$, it is perforated similarly to the pipe $a$. By this construction, the grain contained in the drum $b$ may be permeated by the air which issues from the pipe $a$ in the simplest possible manner. The grain is poured into the drum $b$, and fills the lower part thereof, massing around the pipe $a$ and finally covering the top of said pipe $a$. The top, however, under ordinary circumstances, is not covered to any great depth, there being an open space left between the top of the grain and the top of the drum $b$. When the air is sent into the pipe $a$, it will issue therefrom all around its periphery, and pass through the grain, but, the greatest tendency of the air in seeking the path of least resistance, provided the drum and pipe are stationary, as in the position shown in Fig. 1, is to issue out of the top of the pipe $a$ through the lighter and less massed part of the grain over the top of said pipe, and then, finding no other means of egress, to divide into two oppositely flowing streams and pass through the grain on each side of the pipe $a$, and thence into the bottom of the drum and through the portion $c$ thereof into the exterior atmosphere. When the drum is rotated and the grain is in a state of agitation, the tendency of the air currents to follow the above described circuit is somewhat interrupted, but the general action is continued as when the drum is at a standstill.

The covers $n$, above described, are constructed, in most instances, of two plates, one the outer impermeable cover plate by means of which the openings in the drum are hermetically sealed against egress of the air, and an inner perforate plate which may be exposed by removing the outer solid cover $n$. The purpose of the inner perforate plate is to expose the grain to the influence of as much atmospheric action as possible in such instances as require it. Thus, a drying process may be carried on in the drum, as well as a cleaning or dusting process.

In Fig. 2, the construction of the outer member, or the drum $b$ is substantially the same as that in Fig. 1, but the inner member, or pipe $a$, is modified to render a more positive and continuous action of the air. As is evident, the pipe $a$ is formed with a perforate section $e$ and an imperforate section $d$, so that all of the air is forced to pass from one side in issuing from the pipe, after which the action of the apparatus is identical with the device of Fig. 1, as is shown by the arrows. By this construction, when the drum is stationary in the position shown in Fig. 2, the air issues from the top of the pipe *a* through the thinner mass of grain, separates, as indicated by the two-headed arrow, and then passes downwardly through the denser mass of grain and out through the perforated section *c* of the drum *b*. When the drum, with its air supply pipe *a*, is rotated, the air still continues to thoroughly permeate the whole mass of grain regardless of the position of the drum. When the drum moves from the position of Fig. 2 to that in which the perforated portion of the pipe *a* is at the bottom and the portion *c* of the drum is at the top, then it is evident that the air issuing downwardly from the pipe *a* will divide into oppositely moving streams and pass upwardly on each side of the pipe *a* to issue out of the top of the drum *b*.

Fig. 3 illustrates a third form of the apparatus. The air-pipe *g*, as is the case in the construction of Fig. 1, is perforated throughout its circumferential area, but is provided with a U-shaped channel *k*, which is or may be disposed within the pipe, with its base in alinement with the air inlet and its free edges in contact with the interior of the pipe, air-tight packing and securing means being secured to said edges to confine the air between the sides of the channel within the pipe *g*. The drum *f* is also formed of an entirely perforate body, and is provided with a member or jacket *h*, which surrounds the major portion of the drum, and is provided with air-tight edges *i*, so that that portion of the drum confined within the jacket is substantially impermeable to the air within the drum, so far as its escape is concerned. Thus, by a proper positioning of the two members *k* and *h*, the currents of air may be directed as desired.

The construction shown in Fig. 4 is similar to that of Fig. 2, with an added means for entirely closing the drum *b*, for use at such times when it is desirable to work the grain without the circulation of air. The device consists of a cover *o* which fits over the perforated portion *c* of the drum *b*, and is removably secured to the drum. In this instance, the covers *p* are secured to or form a part of the cover *o*, while the secondary or perforated covers *n'* are formed as parts of the drum proper, as is the case in Figs. 1 and 2.

It is evident from the above descriptions, that the apparatus which I have devised is well adapted to dust and aerate grains or seeds, and that by a simple means, the contents of the receptacle may be thoroughly and adequately subjected to the action of air currents. Further, it is also evident that the air currents may be regulated and the amount of air introduced to the grain may be defined.

By the arrangements shown in the various modifications it is possible to thoroughly permeate the body of grain contained within the drum either when the drum is stationary or when it is desired to aerate the grain while in motion or in a state of agitation.

While the several constructions described form the preferred assemblages of parts, it is evident that the parts mentioned are interchangeable in the various forms and can be used to advantage by interchange to suit various requirements.

Having thus described my invention, what I claim is:—

1. A device for working grain, comprising in combination, a drum having a perforated section, an air pipe arranged within said drum forming a grain space between said drum and pipe, said air pipe having perforations located to direct the air issuing therefrom toward the top of said drum when the perforated section of the latter is at the bottom, the air being reversed in direction by contact with the top of the drum and leaving the latter at the bottom, and discharge and charge covers on said drum.

2. A device for working grain, comprising in combination, a drum having a perforated section, an air-pipe located in said drum and having a perforated section, said drum and pipe being located to form a grain space therebetween, and charge and discharge covers to said drum, said perforated sections being located in such relation to one another that air passing from said air-pipe will first strike against the solid portion of said drum and then reverse and pass out of the perforated portion of said drum.

3. A device for working grain, comprising in combination, a drum having a perforated section adapted to be exposed to the atmosphere, an air-pipe located within said drum and having a perforated section adapted to emit an air current into said drum in a direction away from the first mentioned perforated section, and charge and discharge covers on said drum.

4. A device for working grain, comprising in combination, a drum having a perforated portion exposed to the atmosphere, and having discharge and charge openings, perforated closures and air-tight covers for said openings, an air-pipe located within said drum and having a perforated portion adapted to emit an air current into said drum in a direction away from the first mentioned perforated portion.

5. A device for working grain, comprising in combination, a drum having an exposed perforated portion, and an air-pipe located within said drum to form an annular grain space between said drum and pipe and having perforations through which air may enter said drum, the perforated portion of said drum being located, so that, when said grain-space is charged, air will issue from said air-pipe first outwardly against the solid portion of said drum and then reverse and pass through the grain to said perforated portion.

6. A device for working grain, comprising in combination, a drum constructed to permit the passage of air through one side, an air-pipe arranged concentrically in said drum to form an annular grain space between drum and pipe, said pipe having perforations through which air may enter said drum, and said drum being adjustable to permit air to escape downwardly therefrom so that when said grain-space is charged, air will issue from said air-pipe upwardly through the thinner layers of grain over said pipe and then reverse and pass downwardly through the grain to escape from the drum.

In testimony whereof I affix my signature in presence of two witnesses.

LUDWIG TOPF.

Witnesses:
  RALPH C. BUSSER,
  ALFRED HOFFMANN.

Copies of this patent may be obtained for five cents each, by addressing the "Commissioner of Patents, Washington, D. C."